United States Patent
Cao

(10) Patent No.: US 7,033,191 B1
(45) Date of Patent: Apr. 25, 2006

(54) PLUGGABLE OPTICAL TRANSCEIVER WITH SLIDING ACTUATOR

(75) Inventor: Chi Hung Cao, North Hollywood, CA (US)

(73) Assignee: Optical Communication Products, Inc., Woodland Hills, CA (US)

( * ) Notice: Subject to any disclaimer, the term of this patent is extended or adjusted under 35 U.S.C. 154(b) by 0 days.

(21) Appl. No.: 11/160,728

(22) Filed: Jul. 6, 2005

Related U.S. Application Data

(60) Provisional application No. 60/632,482, filed on Dec. 2, 2004.

(51) Int. Cl.
*H01R 13/62* (2006.01)

(52) U.S. Cl. ................................ 439/160; 439/157
(58) Field of Classification Search ........... 439/152, 439/153, 157, 160
See application file for complete search history.

(56) References Cited

U.S. PATENT DOCUMENTS

| | | | |
|---|---|---|---|
| 6,186,670 B1 | 2/2001 | Austin et al. | |
| 6,229,708 B1 | 5/2001 | Corbin, Jr. et al. | 361/728 |
| 6,343,950 B1 | 2/2002 | Eginton et al. | 439/540.1 |
| 6,430,053 B1 | 8/2002 | Peterson et al. | 361/728 |
| 6,434,015 B1 * | 8/2002 | Hwang | 439/160 |
| 6,439,918 B1 | 8/2002 | Togami et al. | |
| 6,494,623 B1 | 12/2002 | Ahrens et al. | |
| 6,524,134 B1 | 2/2003 | Flickinger et al. | 439/607 |
| 6,530,785 B1 | 3/2003 | Hwang | 439/76.1 |
| 6,556,445 B1 | 4/2003 | Medina | 361/728 |
| 6,570,768 B1 | 5/2003 | Medina | 361/747 |
| 6,580,614 B1 | 6/2003 | Yen et al. | |
| 6,612,858 B1 | 9/2003 | Stockhaus | |
| 6,705,764 B1 | 3/2004 | Shang | |
| 6,705,879 B1 | 3/2004 | Engel et al. | |
| 6,749,448 B1 | 6/2004 | Bright et al. | |
| 6,762,940 B1 | 7/2004 | Zaremba | |
| 6,771,511 B1 | 8/2004 | Bui | |
| 6,778,399 B1 | 8/2004 | Medina et al. | |
| 6,780,053 B1 | 8/2004 | Yunker et al. | |
| 6,789,958 B1 | 9/2004 | Ahrens et al. | |
| 6,805,574 B1 * | 10/2004 | Huang | 439/357 |
| 6,811,317 B1 | 11/2004 | Chiu et al. | |
| 6,819,568 B1 | 11/2004 | Cao | 361/728 |
| 6,885,560 B1 | 4/2005 | Zaremba | 361/754 |
| 2003/0171022 A1 | 9/2003 | Distad et al. | |
| 2003/0198029 A1 | 10/2003 | Zaremba | |
| 2003/0228799 A1 | 12/2003 | Machado et al. | |
| 2004/0029417 A1 | 2/2004 | Engel et al. | |
| 2004/0105239 A1 | 6/2004 | Chiang | |
| 2004/0132327 A1 | 7/2004 | Minota | |
| 2004/0185696 A1 | 9/2004 | Long et al. | |

(Continued)

*Primary Examiner*—Tho D. Ta
(74) *Attorney, Agent, or Firm*—Barlow, Josephs & Holmes

(57) ABSTRACT

A pluggable optical transceiver module includes a housing with first and second ends, upper and lower surfaces, a channel and an opening slot formed thereon. A locking boss is slidably mounted within the housing and has a locking detent projecting therefrom and through the opening slot of the housing to engage an opening in a latching tab located in a receptacle cage. The locking boss also has a top end with an inclined surface, which is disposed within the channel of the housing. An actuator arm is slidably mounted within the channel of the housing and has an internal end with an inclined surface thereon. The inclined surface of the actuator arm cooperates with the inclined surface of the of the locking boss to free the locking detent from the latching tab of the receptacle cage when the actuator arm is moved within the channel of the housing.

19 Claims, 10 Drawing Sheets

U.S. PATENT DOCUMENTS

2004/0235332 A1   11/2004   Ice

\* cited by examiner

PLUGGABLE OPTICAL TRANSCEIVER WITH SLIDING ACTUATOR

CROSS REFERENCE TO RELATED APPLICATION

This application claims priority to earlier filed U.S. Provisional Application Ser. No. 60/632,482, filed Dec. 2, 2004, the contents of which are incorporated herein by reference.

BACKGROUND OF THE INVENTION

1. Field of the Invention

The instant invention relates generally to small form-factor pluggable (SFP) optical transceivers. Particularly, the invention relates to a SFP transceiver having a sliding actuator lever arm that provides a quick and easy way to remove the SFP transceiver from a receptacle assembly.

2. Background of the Related Art

SFP optical transceivers are known in the industry and have been the subject of various industry standards and sourcing agreements between common vendors. In particular, multiple vendors have entered into a multi-source agreement (MSA) setting forth common standards and specifications for SFP optical transceivers. An optical transceiver is generally an integrated fiber optic component including an optical transmitter and an optical receiver. The pluggable optical transceiver module includes a first end having a fiber optical connector and a second end having an electrical connector. The mating fiber optical connector is typically an LC type form factor, compliant with the applicable LC intermateability standards and specifications. The LC type connectors can be in either a simplex or duplex configuration. In addition, other types of optical connector interfaces may be used within the SFP transceiver form factor. The electrical connector is a card edge connector that is received by a female electrical connector housed inside of a receptacle assembly. The receptacle assembly is mounted on a daughter card of a host system. A common mechanical and electrical outline for the SFP optical transceiver is defined by the MSA. However, each individual manufacturer is responsible for its own development and manufacturing of the SFP optical transceiver including developing a method for releasing and removing the transceiver from the receptacle assembly.

One type of optical transceiver module recently developed by the industry is a single fiber, bi-directional SFP transceiver that provides a quick and reliable interface for Gigabit Ethernet applications and other systems. This single fiber, bi-directional SFP transceiver is capable of transmitting signals into an optical fiber and capable of receiving signals from the same optical fiber. The transceiver can simultaneously send and receive data with this single fiber, bi-directional electro-optical mechanism. When packaging the SFP transceivers in end-use systems, multiple SFP transceivers are typically arranged along columns and rows to form a stacked array of transceivers. Each SFP transceiver is plugged into a receptacle assembly in the stacked array. In such densely packed arrays, an alternative style release mechanism is desired in order to remove a SFP transceiver from a receptacle assembly in a simpler fashion.

To expand on this, in some applications, it can be difficult to access and remove the SFP transceivers from the receptacle assemblies in the stacked array. A person may not be able to access the release mechanism of the SFP transceiver easily. Also, due to accessibility and clearance issues, the SFP transceiver release mechanism may not function easily and special tools for removing the transceiver may be required. Thus, there is a need for a SFP optical transceiver having a release mechanism that allows a person to easily and quickly remove the transceiver from the receptacle. The present invention provides such a new release mechanism for an optical transceiver module.

SUMMARY OF THE INVENTION

The present invention solves the problems of the prior art by uniquely providing a pluggable optical transceiver module with a sliding actuator arm having a cammed surface that biases a locking boss away from a receptacle cage to free the module. More specifically, the pluggable optical transceiver module of the present invention includes a housing with first and second ends, upper and lower surfaces, a channel and an opening slot formed thereon. A locking boss is slidably mounted within the housing and has a locking detent projecting therefrom and through the opening slot of the housing to engage an opening in a latching tab located in a receptacle cage. The locking boss also has a top end with an inclined surface, which is disposed within the channel of the housing. An actuator arm is slidably mounted within the channel of the housing and has an internal end with an inclined surface thereon. The inclined surface of the actuator arm cooperates with the inclined surface of the of the locking boss to free the locking detent from the latching tab of the receptacle cage when the actuator arm is moved within the channel of the housing.

Accordingly, among the objects of the present invention is the provision for a pluggable optical transceiver module that has a sliding actuator arm.

Another object of the present invention is the provision for a pluggable optical transceiver module that locks securely within its receptacle cage.

Yet, another object of the present invention is the provision for a pluggable optical transceiver module that is easily removed from its receptacle cage.

Yet, another object of the present invention is the provision for a pluggable optical transceiver module that requires no additional tools to remove it from its receptacle cage.

Yet, another object of the present invention is the provision for a pluggable optical transceiver module that

BRIEF DESCRIPTION OF THE DRAWINGS

The preferred embodiments of the invention, together with further objects and attendant advantages, are best understood by reference to the following detailed description taken in connection with the accompanying drawings in which.

DETAILED DESCRIPTION OF THE PREFERRED EMBODIMENT

Figure 1:
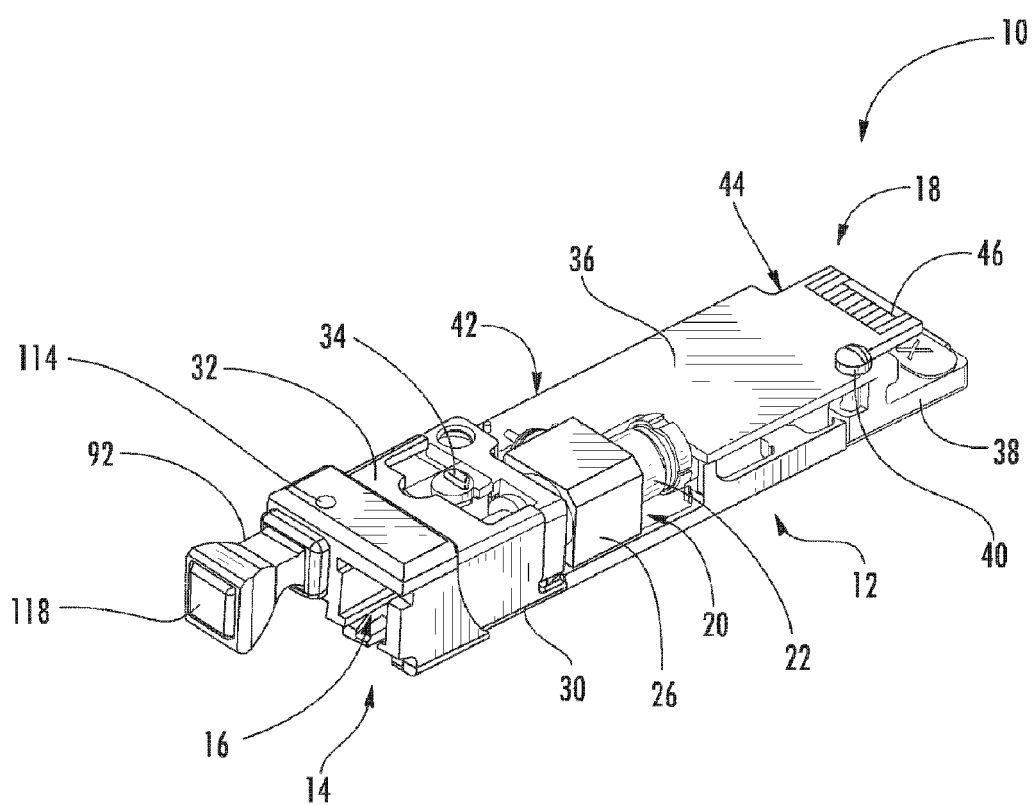
FIG. 1 is a bottom perspective view of a pluggable transceiver module of the present invention containing an optical subassembly—the transceiver cover is removed in this view.

Referring now to the drawings, the pluggable optical transceiver module of the instant invention is illustrated and generally indicated at 10 in FIG. 1.

Figure 2:
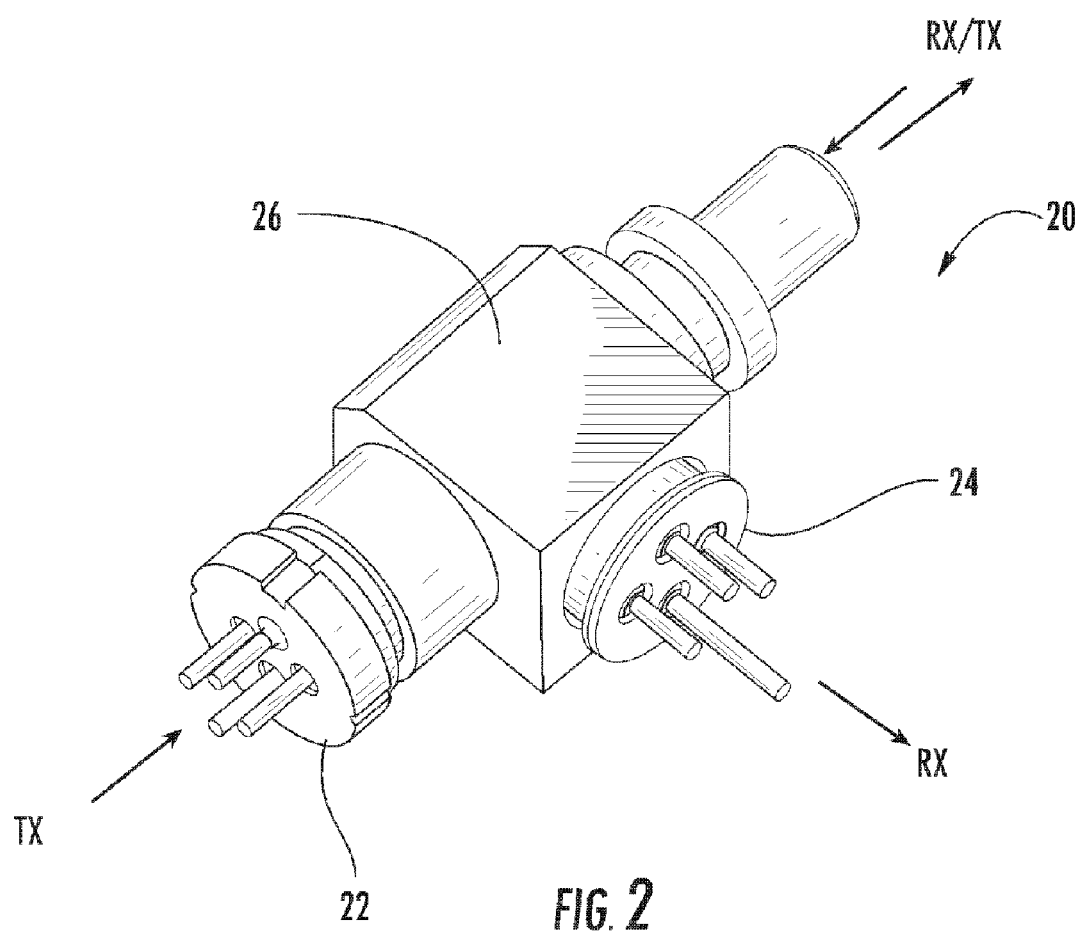
FIG. 2 is a perspective view of the optical subassembly contained within the pluggable optical transceiver of FIG. 1.

The pluggable optical transceiver module 10 includes a housing generally indicated at 12 having a first end or face portion 14 with an optical fiber connector port 16 formed therein and an opposing second end portion 18. The transceiver module 10 shown in FIG. 1 is a single fiber, bi-directional transceiver capable of transmitting signals into an optical fiber and capable of receiving signals from the same optical fiber. The transceiver module includes an optical subassembly generally indicated at 20 which is shown in more detail in FIG. 2. The optical sub-assembly 20 includes an optical transmitter (TX) 22 and an optical receiver (RX) 24. The optical sub-assembly 20 includes a junction box 26 containing a filtering means (not shown) for distinguishing and filtering different optical wavelengths. The optical sub-assembly 20 shown in FIG. 2 is one example of a unit that can be installed in the optical transceiver module 10 of this invention and is shown for illustration purposes only. It is recognized that other optical subassembly units having different configurations can be installed in the optical transceiver 10 in accordance with this invention. The single fiber, bi-directional optical transceiver 10 of this invention can be connected to standard 20-pin SFP transceiver connectors, and the transceivers 10 are hot pluggable. Thus, a system designer can make configuration or maintenance changes by simply removing and plugging in individual transceivers 10 without having to remove the power supply of the host system or removing the mated LC optical connector. Furthermore, the transceiver modules 10 can be removed from the host system without disturbing adjacent transceiver modules in the system.

The housing 12 of the transceiver module 10 includes an upper (top) surface 30 and a lower (bottom) surface 32. The bottom surface 32 of the transceiver 10 allows for protrusion of a projecting locking boss 34 which secures the transceiver 10 in a receptacle cage/assembly 50 (FIG. 4) as described in further detail below. The transceiver 10 encases a circuit board 36 and an optical sub-assembly 20. The circuit board 36 is secured to a base 38 of the transceiver 10 by a fastening screw 40. The circuit board 36 includes a forward-facing end portion 42 and a rear-facing end portion 44. The rear-facing end 44 forms an exposed electrical edge connector 46. The electrical edge connector 46 is configured to be compatible with a corresponding electrical connector that is positioned within the receptacle cage/assembly 50 or host device. A metallic cover 51 (FIG. 3) encloses and protects the transceiver housing 12 and provides electromagnetic interference (EMI) shielding and case grounding to a chassis ground. The face 14 of the transceiver housing 12 is generally rectangular, slightly longer side-to-side, when viewed from a front perspective. The width and height of the transceiver housing 12 are fixed by SFP MSA standards. A latching surface is provided within the connector port 16 to permit engagement with the standard optical connector fiber assembly latching features.

Figure 3:
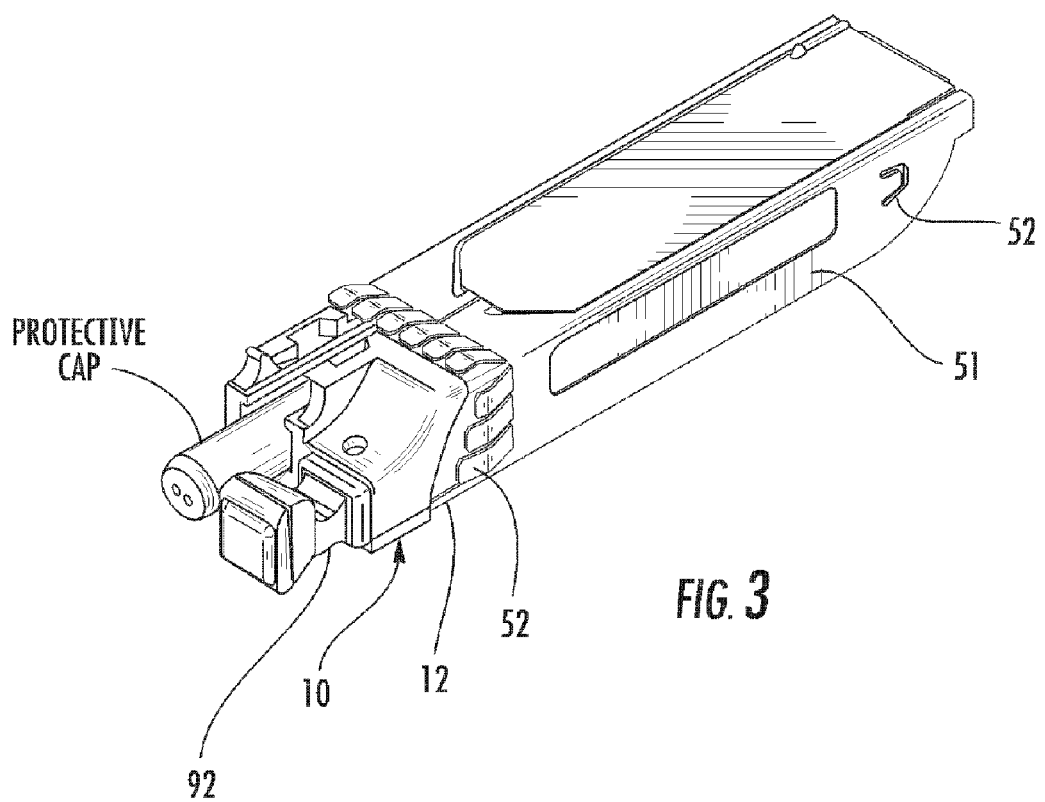
FIG. 3 is a top perspective view showing the pluggable transceiver module of FIG. 1 enclosed by a metallic cover.

Referring to FIG. 3, a top perspective view of the transceiver module 10 enclosed and protected by metal cover 51 is shown. The metal cover 51 includes metal contacts 52 designed to lock and ground the cover to the main housing 12 as well as contacts meant for grounding the cover to the receptacle cage/assembly 50.

Figure 4:
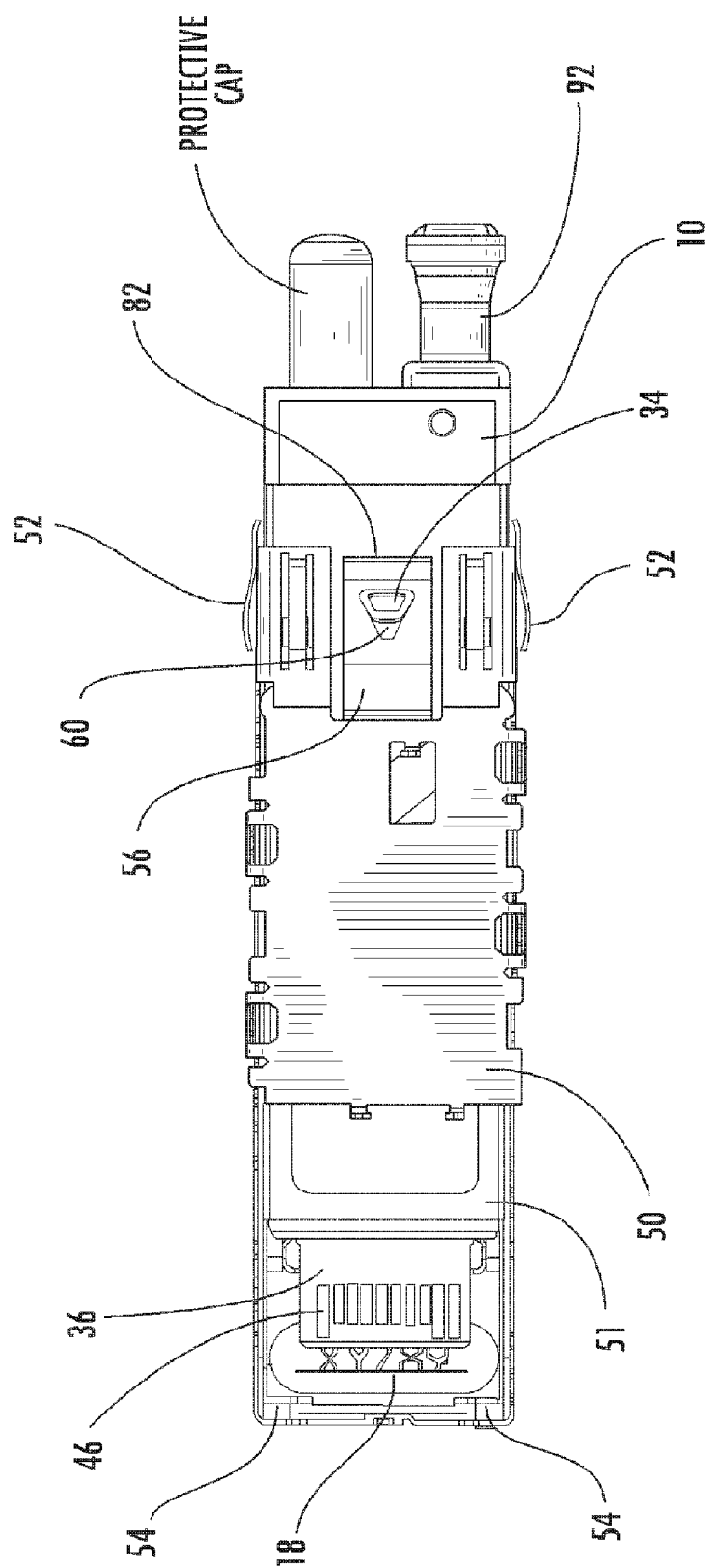
FIG. 4 is a bottom perspective view of a receptacle cage/assembly showing the pluggable transceiver module of FIG. 1 in a locked position within the receptacle cage/assembly in accordance with the present invention.
Figure 4A:
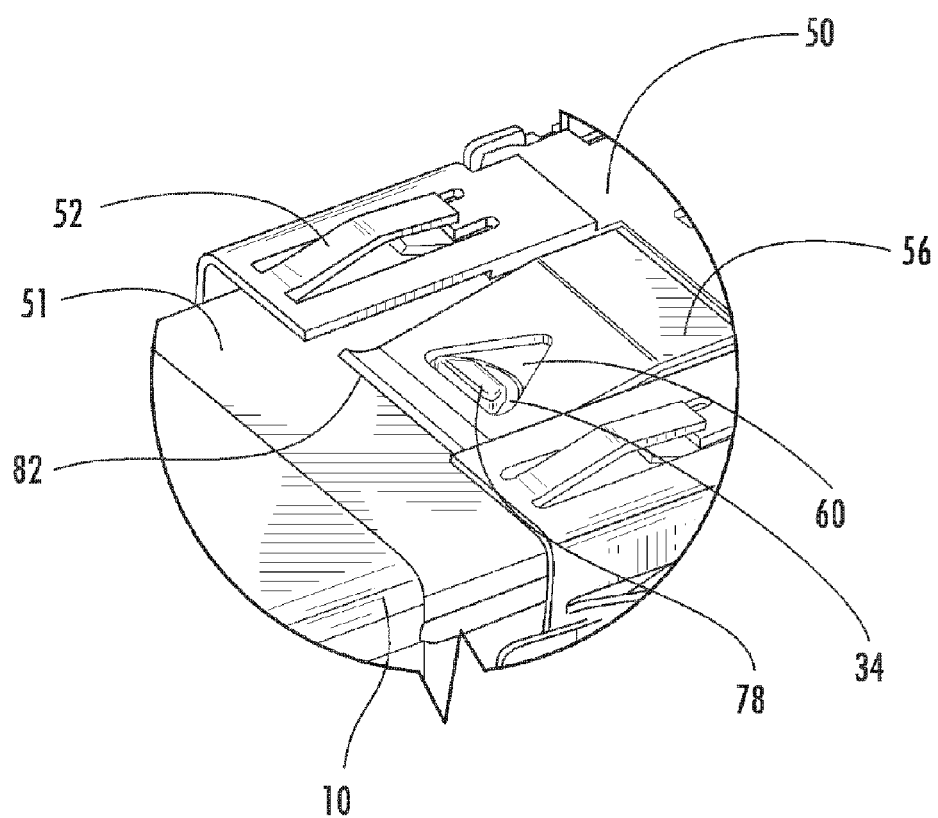
FIG. 4A is a close-up view of the receptacle cage/assembly and pluggable transceiver module of FIG. 4 showing the transceiver module in a locked position within the receptacle cage/assembly.
Figure 4B:
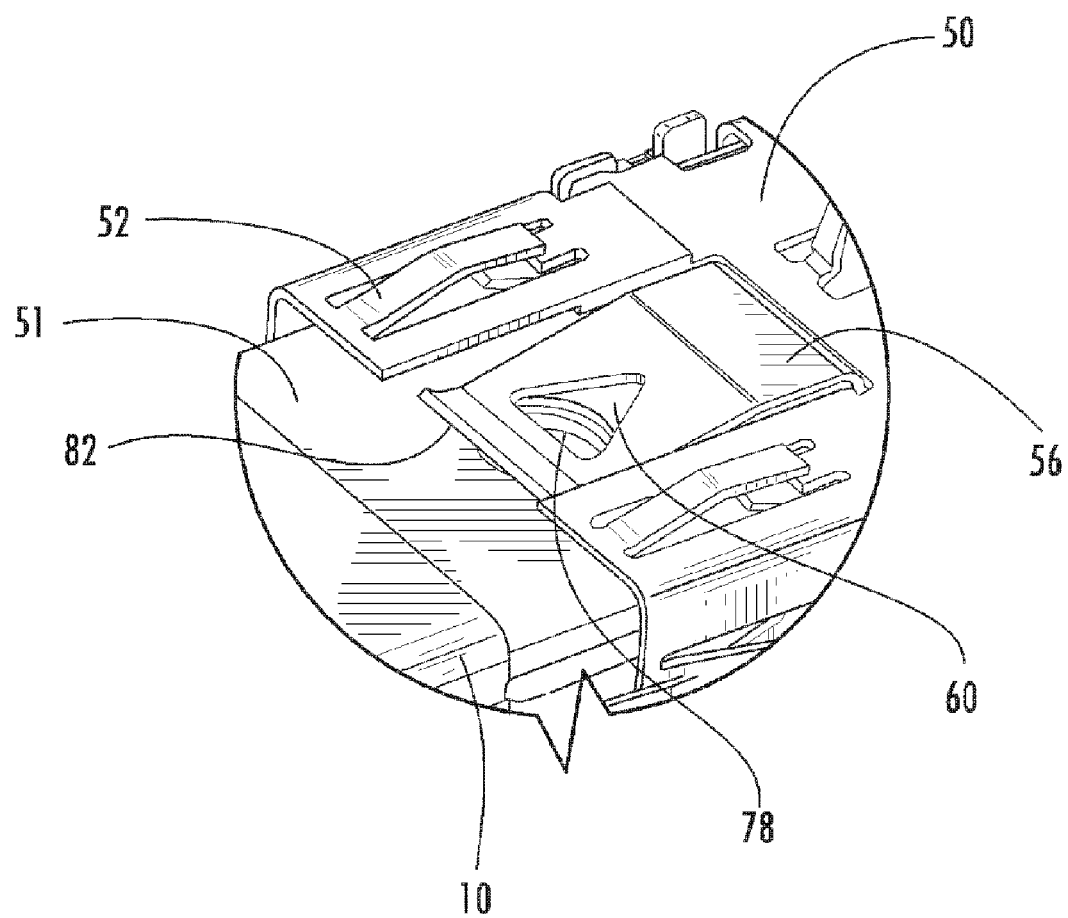
FIG. 4B is a close-up view of a receptacle cage/assembly showing the pluggable transceiver module of FIG. 1 in an unlocked position within the receptacle cage/assembly.

Referring to FIG. 4, a bottom perspective view of a receptacle cage/assembly 50 which receives the transceiver module 10 is shown. The receptacle cage/assembly 50 may in turn be mounted on a daughter card of a host system such as a printed circuit board (not shown). The receptacle cage/assembly 50 includes metal contacts 52 designed to contact and ground the assembly 50 when the assembly 50 is positioned within a stacked array of assemblies 50. The receptacle cage/assembly 50 includes kick-out springs 54 located at a rear end of the assembly 50. The kick-out springs 54 engage the rear-end 18 of the transceiver module 10 and bias the transceiver 10 outwardly. A bendable latching tab 56 is located on a base of the receptacle cage/assembly 50 and is adjacent to an open forward end of the assembly 50. The latching tab 56 includes an opening or slot 60 therein for engaging the locking boss 34 of the transceiver module 10 so that the transceiver 10 can be locked within the receptacle cage/assembly 50. In FIGS. 4, 4A, and 4B, the opening 60 in the bendable latching tab 56 is shown having a triangular-shape for illustration purposes. It is understood that the opening 60 in the bendable latching tab 56 can be of any suitable shape that will receive and engage the locking boss 34 of the transceiver 10. FIGS. 4 and 4A show the transceiver module 10 in a fully engaged or locked position within the receptacle cage/assembly 50, while FIG. 4B shows the transceiver module 10 in a disengaged or unlocked position. The transceiver 10 can be pulled away and removed from the receptacle cage/assembly 50 while it is in an unlocked position as shown in FIG. 4B.

The inserting of the transceiver module 10 into the receptacle cage/assembly 50 to lock the transceiver 10 within the receptacle cage/assembly 50, and the subsequent removal of the transceiver 10 from the receptacle cage/assembly 50 are described in further detail below.

1. Transceiver Locking Boss

Figure 5:
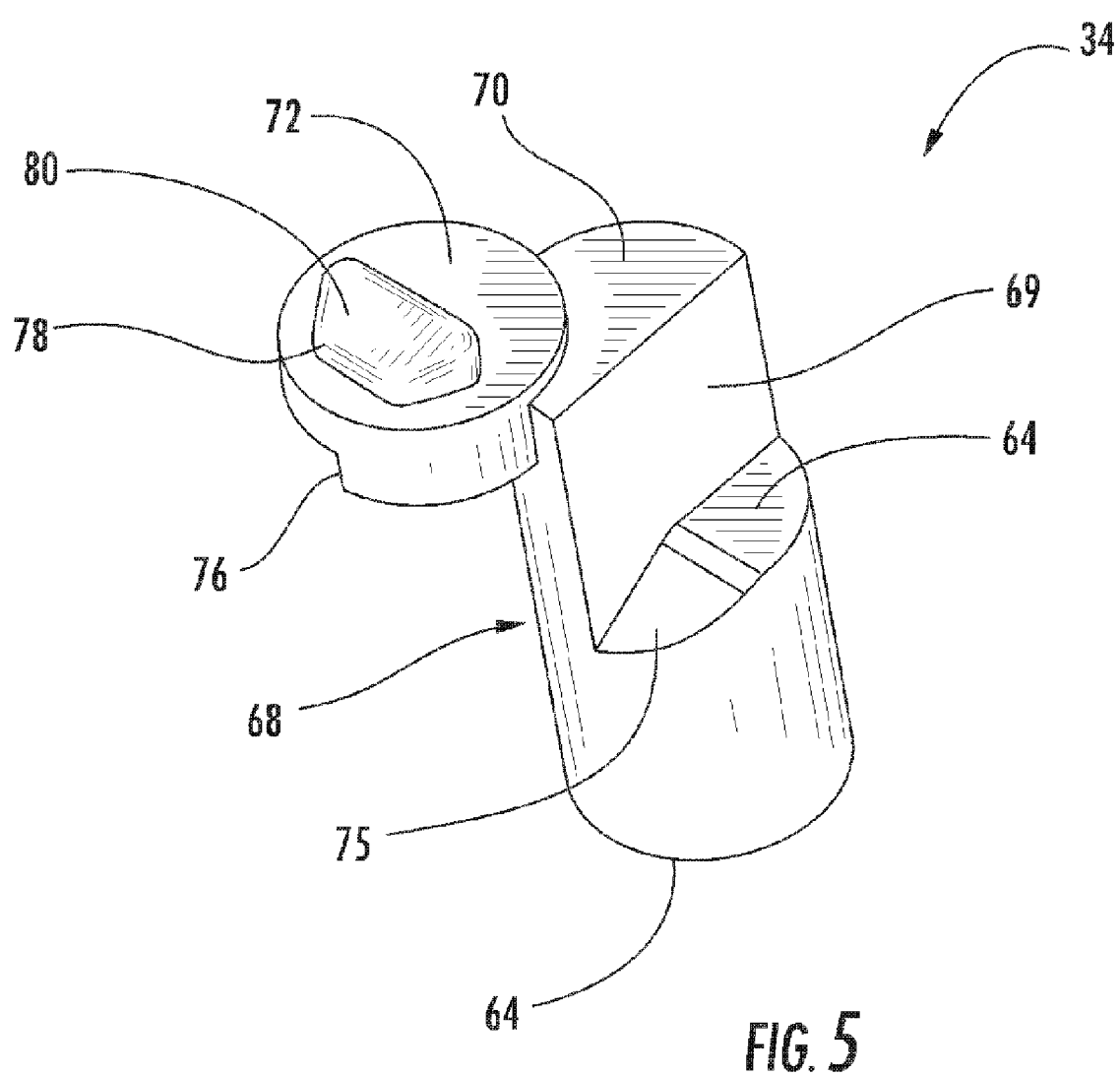
FIG. 5 is perspective view of the locking boss of the pluggable transceiver module of FIG. 1.

Referring to FIG. 5, the locking boss 34 of the transceiver module 10 is shown in more detail. The locking boss 34 is a single piece having a generally cylindrical structure that includes a first (top) end 64 having a recessed seat 66 therein for receiving a spring (FIG. 7), an intermediary vertically extending segment 68, and a second (bottom) end 70 having a locking detent 72 extending laterally therefrom.

Figure 7:
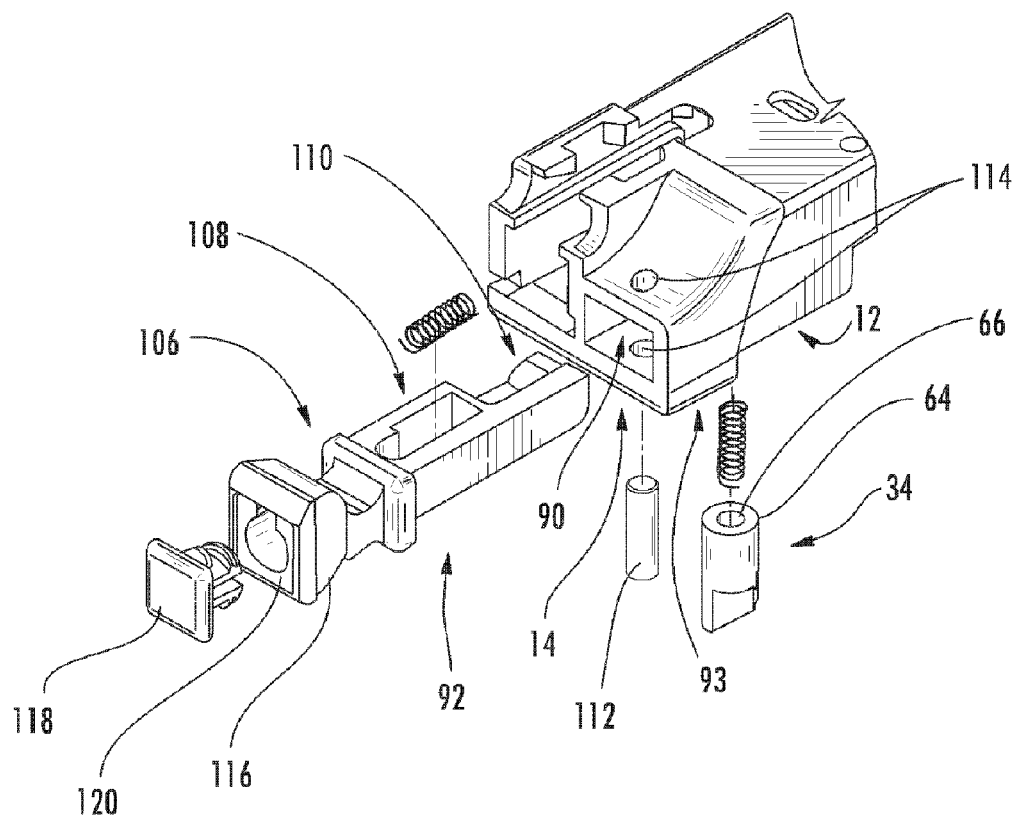
FIG. 7 is an exploded top perspective view of the pluggable transceiver module of FIG. 1 showing the actuator lever arm, retaining pin, locking boss and springs.

As shown in FIG. 7, the locking boss 34 is spring-loaded. A spring is captured between the top end 64 of the locking boss 34 and top inner surface of the transceiver module 10. More particularly, the seat 66, which is located in the top end 64 of the locking boss 34, captures one end of the spring. The top inner surface of the transceiver module 10 captures the other end of the spring.

Referring back to FIG. 5, the vertically extending segment 68 of the locking boss 34 includes a cut-out portion with an internal surface 69, wherein the cut-out portion forms a ledge 74 having an inclined surface 75. An inner side surface of the actuator lever arm 92 (FIG. 6) will engage this internal surface 69 of the locking boss 34 as described in further detail below.

The second (bottom) end 70 of the locking boss 34 has a locking detent 72 extending laterally therefrom. The locking detent 72 has a first (top) surface which has a raised shoulder abutment 76, and a second (bottom) surface having a locking projection 78 extending therefrom. The locking projection 78 will enter the slot 60 in the bendable latching tab 56 of the receptacle cage/assembly 50 as the transceiver 10 is inserted into the receptacle 50. The locking projection 78 has an inclined or angled surface 80. The inclined surface 80 of the locking projection 78 allows the locking projection to slide more easily under the lip 82 of the bendable latching tab 56 during insertion of the transceiver 10 into the receptacle 50 as described in further detail below.

2. Transceiver Housing

Figure 6:
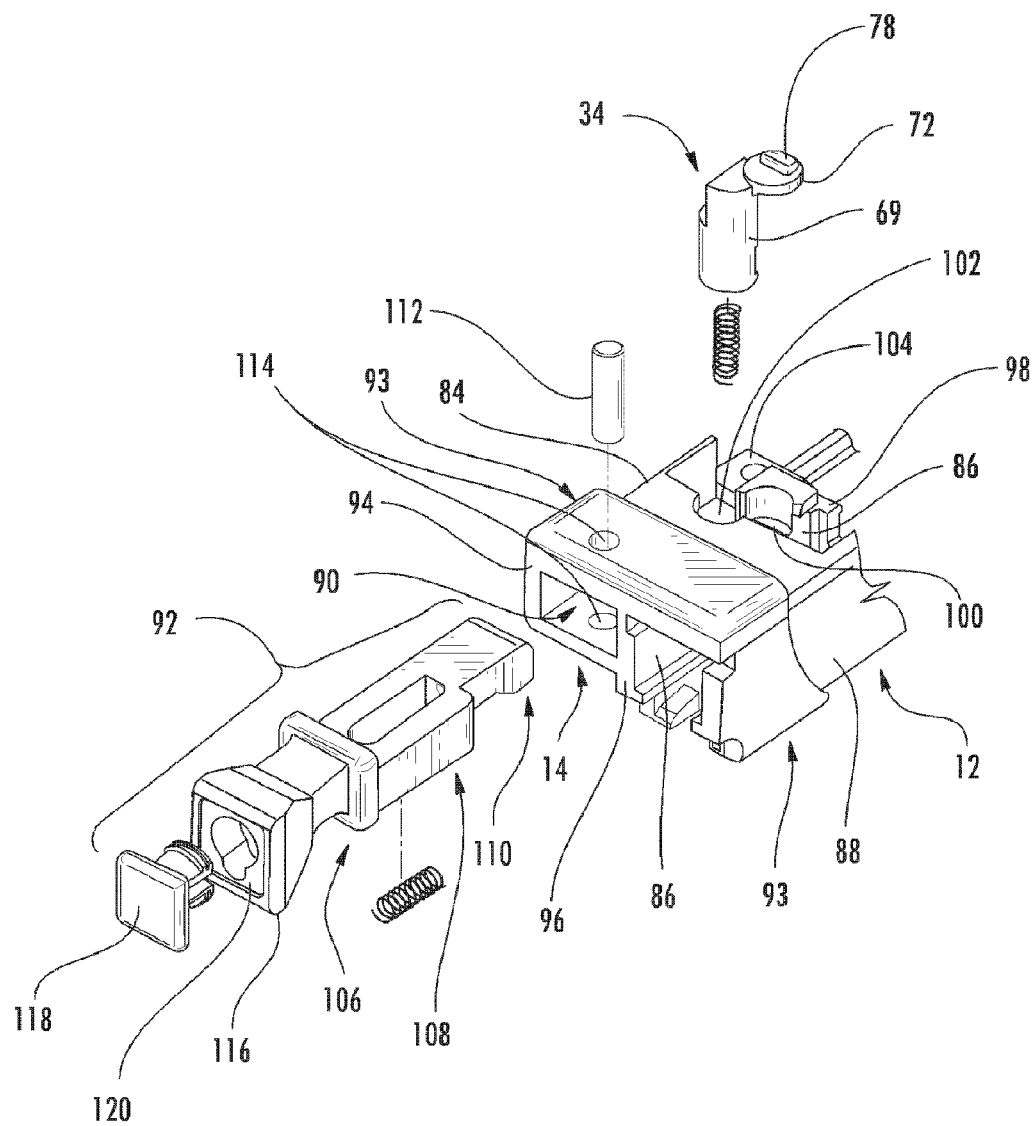
FIG. 6 is an exploded bottom perspective view of the pluggable transceiver module of FIG. 1 showing the actuator lever arm, retaining pin, locking boss, and springs.

As shown in FIG. 6, the transceiver housing 12 includes a first (external) side wall segment 84, a central (interior) wall segment 86, and a second (external) side wall segment 88. The first external side wall segment 84 and interior wall segment 86 define a channel 90 with an opening at the face 14 of the transceiver housing 12. An actuator lever arm 92 is slidably mounted within this channel 90 as described in further detail below.

More particularly, the first external side wall segment 84 abuts a forward-facing shoulder segment 93 of the transceiver housing 12. The shoulder segment 93 includes a forward-facing area 94 which forms part of the face 14 of the transceiver housing 12. The first external side wall segment 84 extends rearwardly along a portion of the transceiver housing 12. The interior wall segment 86 also includes a forward-facing portion 96 which forms part of the face 14 of the transceiver housing 12. The interior wall segment 86 extends rearwardly along a portion of the transceiver housing 12 and includes a rear-facing portion 98. The rear-facing portion 98 of the interior wall segment 86 includes a cut-out area that forms a seat or ledge 100 for receiving the locking detent 72 of the locking boss 34. The top inner surface of the channel 90 includes a bored-out area 102 for receiving the locking boss spring and vertically extending segment 68 of the locking boss 34.

The channel 90 in the transceiver housing 12 further includes a rear stop plate 104. The stop plate 104 provides a stopping position for the actuator lever arm 92 when the lever arm is pushed inwardly. The stop plate 104 prevents a rear end of the actuator lever arm 92 from going past a predetermined position when the lever arm 92 is pushed inwardly.

3. Actuator Lever Arm

Referring to FIG. 7, the actuator lever arm 92 is a single piece structure including a forward-facing portion or plate 106 that engages the face 14 of the transceiver housing 12 as the actuator lever arm 92 is pushed into the channel 90 of the transceiver housing 12; an intermediary channeled portion 108 for capturing a slide spring; and a rear-facing portion 110 that engages the locking boss 34 of the transceiver module 10. The actuator lever arm 92 is slidably mounted within the channel 90 so that it can slide back and forth in accordance with this invention. The actuator lever arm 92 is retained in the transceiver module 10 by a retaining pin 112 that extends through the intermediary channeled portion 108 of the actuator lever arm 92. Fastening holes 114 are located in the top and bottom surfaces 30, 32 of the transceiver housing 12, and the retaining pin 112 is inserted through these holes 114.

The actuator lever arm 92 can be made as a single piece with a finger tab 116 integrally connected to its forward-facing plate 106. The finger tab 116 is configured so that it extends beyond the face 14 of the transceiver housing 12. The finger tab 116 allows a person to have easy access to the actuator lever arm 92. A person can grasp the finger tab 116 easily and pull or push on the finger tab 116. Pulling on the finger tab 116 causes the actuator lever arm 92 to slide outwardly. Pushing on the finger tab 116 causes the actuator lever arm 92 to slide inwardly. The finger tab 116 can be outfitted with a "snap-on" identifying panel 118. For example, the snap-on panel 118 can be color-coded. The finger tab 116 can have a recessed, forward-facing surface 120 for mounting the color-coded panel 118 thereto. The color of the panel 118 may vary depending upon the type of transceiver 10. For example, the colored, snap-on panel 118 can be used to identify a wavelength of the transceiver 10. Different transceivers 10 can be outfitted with different colored panels 118 depending upon the given wavelength of the transceiver 10. In this manner, a person can identify the transceiver 10 quickly by simply looking at the forward-facing colored panel 118 mounted on the finger tab 116.

Figure 8:
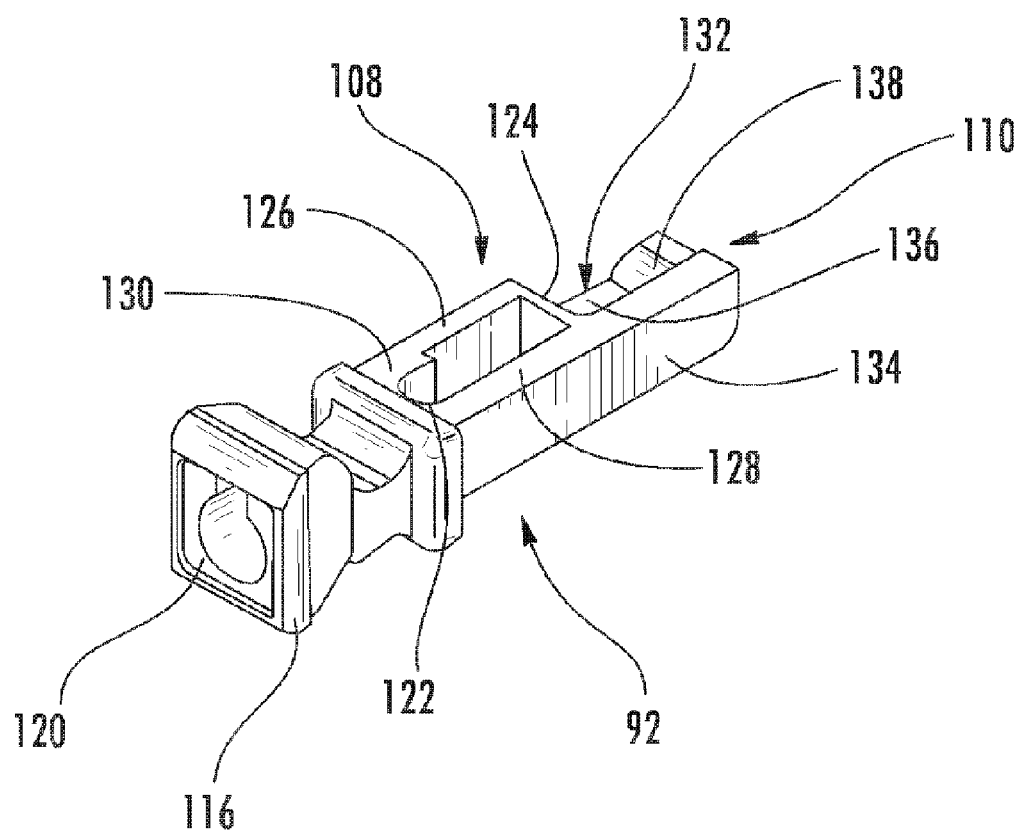
FIG. 8 is a close-up view of the actuator lever arm shown in FIG. 7.

The actuator lever arm 92 is spring-loaded. The slide spring is contained within the intermediary channeled portion 108 of the actuator arm 92. Referring to FIG. 8, the channeled portion 108 is shown in more detail. The channeled portion 108 includes a first (front) wall 122, a second (back) wall 124, a first (internal) side wall 126, and a second (external) side wall 128. The back wall 124 of the channel 108 captures one end of the slide spring. A shoulder tab 130, which protrudes from the internal side wall 126 of the channeled portion 108 and into the channel 108, captures the other end of the slide spring.

The rear-facing end portion 110 of the actuator lever arm 92 includes a first (inner) side surface 132, and an second (outer) side surface 134. The inner side surface 132 of the end portion 110 of the actuator lever arm 92 is indented slightly from the internal side wall 126 of the channeled portion 108 of the actuator lever arm 92. The top surface of the end portion 110 of the actuator lever arm 92 includes a cut-out area that forms a ledge or seat 136 for receiving the complementary ledge portion 74 of the locking boss 34. The top surface of the end portion 110 further includes an internal end 138 having an inclined surface.

4. Locking of the Transceiver Within the Receptacle Cage/Assembly

During insertion of the transceiver module 10 into the receptacle cage/assembly 50, a person pushes the actuator lever arm 92 inwardly so that the locking detent 72 on the latching boss 34 slides under the lip 82 of the bendable latching tab 56 of the receptacle cage 50. When the locking detent 72 slides under the lip 82, the locking projection 78 on the locking detent 72 will catch and enter the opening 60 in the bendable latching tab 56, thus securing the transceiver module 10 within the receptacle cage/assembly 50. As shown in FIG. 4A, the transceiver module 10 is locked within the receptacle cage/assembly 50 by means of the locking projection 78 engaging and entering the opening 60 in the bendable latching tab 56 of the receptacle cage/assembly 50. Basically, a person can insert the transceiver module 10 into the receptacle cage/assembly 50 by pushing the transceiver 10 into the receptacle cage/assembly 50 until he or she feels the "click" of the locking projection 78 engaging the opening 60 in the bendable latching tab 56.

5. Removal of the Transceiver from the Receptacle Cage/Assembly

In order to release and remove the transceiver module 10 from the receptacle cage 50, a person pulls on the actuator lever arm 92. When a person pulls on the actuator lever arm 92, the actuator arm 92 slides horizontally in a linear (x) direction. The actuator arm 92 is pulled so that it slides outwardly from the transceiver 10. As the actuator arm 92 slides outwardly, the inner side surface 132 at the rear portion 110 of the actuator arm 92 contacts and engages the internal side surface 69 of the locking boss 34. The inner side surface 132 and the inclined plane portion 138 of the actuator lever arm 92 act as a cam on the internal side surfaces 74,75 of the locking boss 34, thereby pushing the locking boss 34 and causing the locking boss 34 to translates in a vertical (y) direction. As the locking boss 34 moves vertically, the locking projection 78 becomes disengaged from the opening 60 in the bendable latching tab 56. As shown in FIG. 4B, the locking projection 78 becomes separated and disengaged from the opening 60 in the latching tab 56, thus unlocking the transceiver module 10 from the receptacle cage 50.

With the locking projection 78 and latching tab 56 disengaged, the kick-out springs 54 (FIG. 4) in the receptacle cage 50 automatically force the transceiver module 10 to slide outwardly. A person can then simply pull the transceiver 10 forwardly and remove the transceiver 10 from the receptacle cage/assembly 50.

While there is shown and described herein certain specific structures embodying the invention, those skilled in the art will understand that various modifications and rearrangements of the parts may be made without departing from the spirit and scope of the underlying inventive concept and that the same is not limited to the particular forms herein shown and described.

What is claimed is:

1. A pluggable optical transceiver module, comprising:
   a locking boss having a bottom end including a locking detent projecting therefrom; and
   a housing having a first end and an opposing second end which define a longitudinal extent of the housing, said housing further having an upper surface and a lower surface which define a transverse extent of the housing, said housing further having an opening slot extending transversely into said housing from said lower surface, said locking boss being received in said opening slot and being slidably movable between a first extended position wherein said locking detent extends outwardly beyond the lower surface of said housing for engaging an opening in a latching tab located in a receptacle cage, and a second retracted position wherein said locking detent is retracted into the housing;
   biasing means for biasing said locking boss to said first extended position;
   means at said first end of said housing for effecting sliding movement of said locking boss from said first extended position to said second retracted position.

2. The pluggable optical transceiver module of claim 1 wherein said means for effecting sliding movement of said locking boss comprises an actuator configured and arranged for sliding movement within said housing along said longitudinal extent, wherein sliding movement of said actuator from a first position to a second position along said longitudinal extent cooperatively induces sliding movement of said locking boss from said first position to said second position along said transverse extent.

3. The pluggable optical transceiver module of claim 2 wherein said locking boss includes an upper end having an inclined cam surface, and further wherein said actuator comprises an actuator arm having an outer end and an inner end, said inner end having an inclined cam surface in cooperative engagement with said inclined cam surface of said locking boss.

4. The pluggable optical transceiver module of claim 3 further comprising biasing means for biasing said actuator arm to said first position.

5. The pluggable optical transceiver module of claim 3 wherein said actuator arm is slidably movable from a first inward position to a second outward position.

6. The pluggable optical transceiver module of claim 5 further comprising biasing means for biasing said actuator arm to said first inward position.

7. A pluggable optical transceiver module, comprising:
   a housing having a first end, an opposing second end, an upper surface, a lower surface, a channel and an opening slot formed thereon;
   a locking boss slidably mounted within the housing, said locking boss having locking detent projecting therefrom and through the opening slot of the housing for engaging an opening in a latching tab located in a receptacle cage, said locking boss having a top end with an inclined surface thereon, said inclined surface disposed within the channel of the housing;
   an actuator arm slidably mounted within the channel of the housing, said actuator arm having an internal end with an inclined surface, said inclined surface of the internal end of the actuator arm cooperating with the inclined surface of the of the top end of the locking boss to free the locking detent on the locking boss from the latching tab of the receptacle cage when said actuator arm is moved within the channel of the housing.

8. The module of claim 7, wherein the locking boss is displaced upwardly when the actuator arm is slid outwardly from the housing.

9. The module if claim 7, wherein the locking boss is slidable between the upper surface and the lower surface of the housing.

10. The module of claim 7, wherein the movement of the locking boss is substantially perpendicular to the lower surface of the housing.

11. The module of claim 7, wherein the channel is oriented on the housing is oriented between the first end and the opposing second end.

12. The module of claim 7, wherein the locking boss is spring-biased downwardly towards the lower surface of the housing.

13. The module of claim 7, wherein the actuator arm is spring-biased inwardly into the channel.

14. The module of claim 7, further comprising a metallic cover received over the housing, the metallic cover configured and arranged to substantially limit electromagnetic interference from entering or exiting the module.

15. The module of claim 7, wherein the locking detent of the locking boss is laterally offset from a vertical centerline of the locking boss.

16. The module of claim 7, further comprising:
   an intermediary channeled portion formed on the actuator arm;
   fastening holes formed on the channel of the housing; and
   a retaining pin disposed within the intermediary channeled portion of actuator arm and locked into the fastening holes on the housing;
   whereby the actuator arm may only travel the length of the intermediary channeled portion within the channel of the housing.

17. The module of claim 16, further comprising a spring positioned within the intermediary channeled portion of the actuator arm and against the retaining pin to spring-bias the actuator arm inwardly into the channel of the housing.

18. The module of claim 7, wherein the actuator arm further comprises a forwardly projecting extension forming a finger-tab.

19. The module of claim 18, wherein the finger tab of the actuator arm further comprises a snap-on plate.

* * * * *